US009062184B2

(12) United States Patent
Skoumal et al.

(10) Patent No.: US 9,062,184 B2
(45) Date of Patent: Jun. 23, 2015

(54) METHOD OF PREPARATION OF NUCLEATED SEMI-CRYSTALLINE POLYMER

(75) Inventors: Miroslav Skoumal, Brno (CZ); Ladislav Pospíšil, Brno (CZ); Petra Zbořilová, Brno (CZ)

(73) Assignee: POLYMER INSTITUTE BRNO, SPOL. S.R.O. (CZ)

( * ) Notice: Subject to any disclaimer, the term of this patent is extended or adjusted under 35 U.S.C. 154(b) by 0 days.

(21) Appl. No.: 13/877,417

(22) PCT Filed: Dec. 27, 2010

(86) PCT No.: PCT/CZ2010/000134
§ 371 (c)(1),
(2), (4) Date: Apr. 2, 2013

(87) PCT Pub. No.: WO2012/045288
PCT Pub. Date: Apr. 12, 2012

(65) Prior Publication Data
US 2013/0190435 A1    Jul. 25, 2013

(30) Foreign Application Priority Data

Oct. 5, 2010   (CZ) ................ PV 2010-722

(51) Int. Cl.
| *C08K 13/02* | (2006.01) |
| *C08K 5/20* | (2006.01) |
| *C08L 23/12* | (2006.01) |
| *C08F 2/14* | (2006.01) |
| *C08F 2/44* | (2006.01) |
| *C08F 10/00* | (2006.01) |
| *C08K 5/00* | (2006.01) |
| *C08K 5/3492* | (2006.01) |
| *C08F 110/06* | (2006.01) |
| *C08F 210/06* | (2006.01) |

(52) U.S. Cl.
CPC ............... *C08K 13/02* (2013.01); *C08F 10/00* (2013.01); *C08F 110/06* (2013.01); *C08F 210/06* (2013.01); *C08K 5/0083* (2013.01); *C08K 5/34922* (2013.01); *C08K 5/20* (2013.01); *C08L 23/12* (2013.01)

(58) Field of Classification Search
CPC ........ C08K 5/0083; C08K 5/20; C08K 13/02; C08L 23/12; C08F 2/14; C08F 2/44
USPC ........... 524/431, 81, 399, 436, 437, 445, 451, 524/582, 584
See application file for complete search history.

(56) References Cited

U.S. PATENT DOCUMENTS

| 7,259,198 B2 * | 8/2007 | Vaillant ........................ 524/99 |
| 2003/0054161 A1 * | 3/2003 | Forte et al. .................. 428/332 |
| 2005/0031886 A1 | 2/2005 | Forte et al. |
| 2009/0105417 A1 | 4/2009 | Walton et al. |
| 2010/0016491 A1 | 1/2010 | Niga et al. |

FOREIGN PATENT DOCUMENTS

| EP | 0557721 A2 * | 9/1993 |
| EP | 0962489 | 12/1999 |
| EP | 2223943 | 9/2010 |
| EP | 2223943 A1 * | 9/2010 |
| WO | 9924479 | 5/1999 |
| WO | WO 99/24479 * | 5/1999 |
| WO | 2005063866 | 7/2005 |

* cited by examiner

*Primary Examiner* — Ling Choi
*Assistant Examiner* — Ronald Grinsted
(74) *Attorney, Agent, or Firm* — Bryant J. Keller; Kirton | McConkie

(57) ABSTRACT

The method of preparation of nucleated semi-crystalline polyolefin via coordination polymerization, wherein the nucleating agent is dosed in form of the suspension or the solution in a non-polar hydrocarbon solvent or in concentrated organoaluminum as part of the catalyst system for α-olefin polymerization.

10 Claims, 2 Drawing Sheets

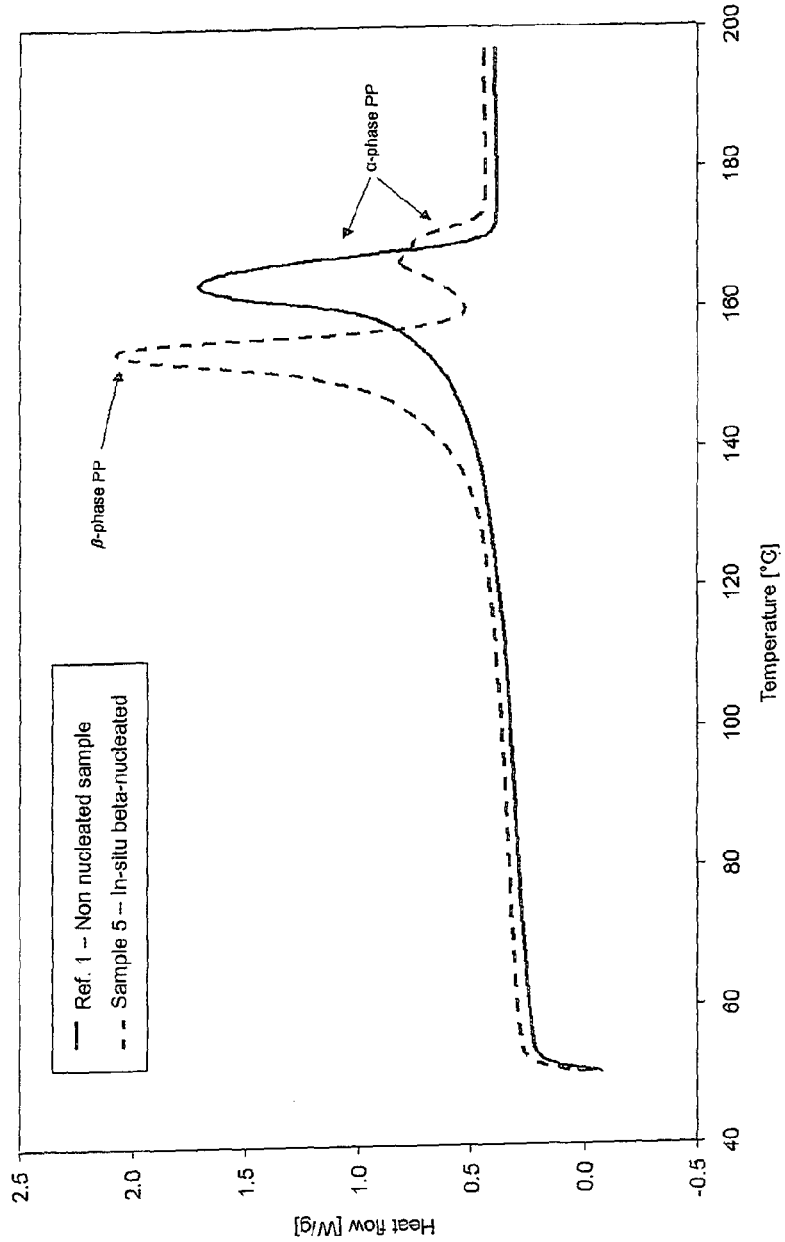
Figure 1: DSC profile of 2$^{nd}$ melting of sample 5- Polypropylene "in situ" nucleated by component 1D (β-nucleating agent based on N,N' – dicyclohexyl naphtalene-2,6-dicarboxamide, nucleating agent concentration level 0.03 wt%) compared with non-nucleated reference material.

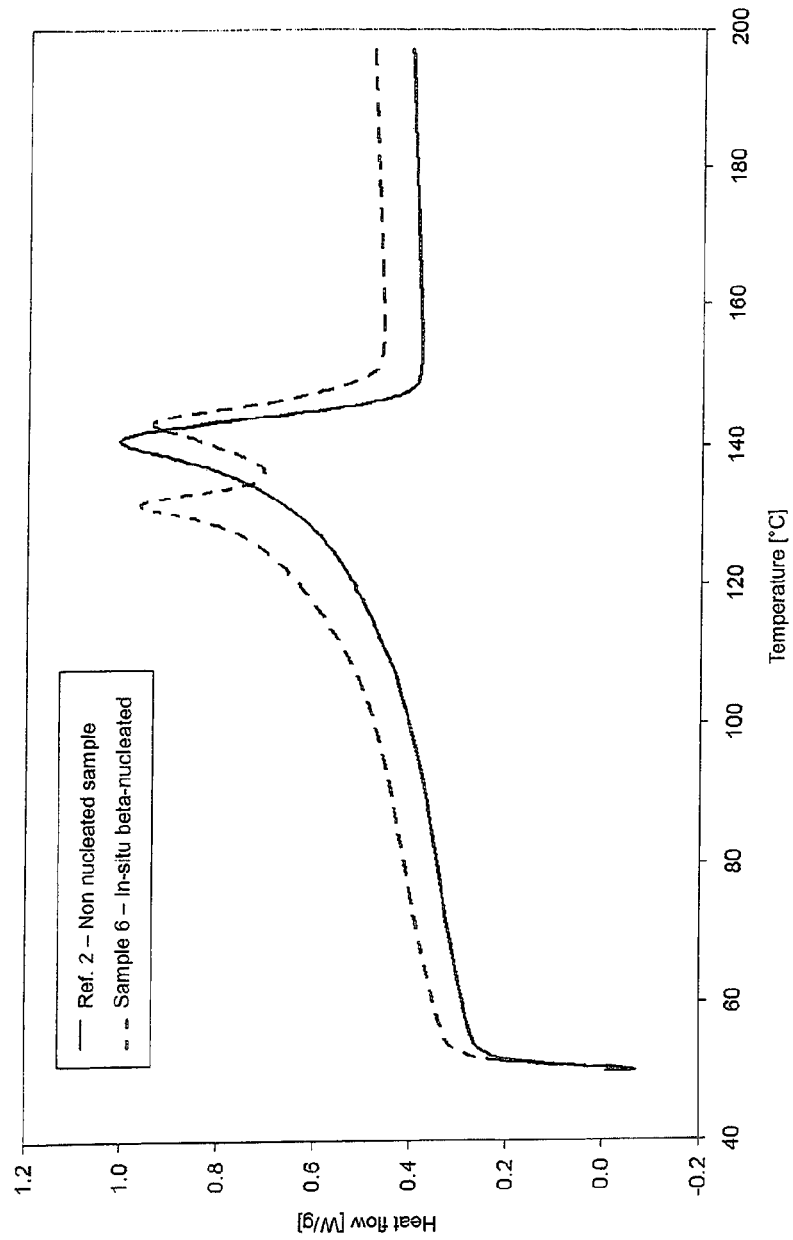
Figure 2: DSC profile of 2nd melting of sample 6 – propylene /ethylene statistical copolymer nucleated "in situ" by 1D component (β-nucleating agent based on N,N' – dicyclohexyl naphtalene-2,6-dicarboxamide, nucleating agent concentration level 0.03 wt%) compared with non-nucleated reference material.

METHOD OF PREPARATION OF NUCLEATED SEMI-CRYSTALLINE POLYMER

FIELD OF THE INVENTION

The invention relates to the method of preparation of nucleated semi-crystalline polyolefin through the coordination polymerization.

STATE OF ART

Polyolefins, such as polypropylene, are semi-crystalline polymers characterized by relatively low toughness. The addition of various organic or inorganic substances can have a positive effect on the properties of materials made thereof. The nucleating agents belong to the group of additives that are capable of increasing the number of nucleating centers in the crystalline polymer thus considerably improving its mechanical and optical properties.

Various salts of aliphatic or aromatic carboxylic acids are typical representatives of nucleating agents, sodium benzoate being the most commonly used nucleant. Besides this, cis-endo-bicyclo (2,2,1) heptane-2,3-dicarboxylic acid or its salts as well as sodium 2,2'-methylene bis-(4,6-di-tert-butylphenyl) phoshate or aluminum hydroxide-bis[2,2'-methylenebis (4,6-di-tert-butylphenyl)phoshate] can serve examples of commercially employed substances. There are many other nucleating agents described in patents, see e.g. U.S. Pat. No. 3,367,926, U.S. Pat. No. 4,694,064 and U.S. Pat. No. 3,852,237.

Also various pigments and minerals such as clays, silicates, talc, graphite or carbon nanotubes can exhibit the nucleating ability in semi-crystalline polymers.

Sorbitol derivatives represent an important group of nucleating agents for semi-crystalline polyolefins such as polypropylene. These compounds, having the melting temperature close to that of polypropylene, exhibit good nucleating ability which, in the case of polypropylene, results not only in the improved mechanical properties but also in increased transparency to the visible light. Out of the commercially available sorbitol based additives, the 3,4-dimethyl benzylidene sorbitol or bis(4-propylbenzylidene)propyl sorbitol are the most frequently applied.

The structures such as 1,3,5-tris(2,2-dimethylpropanamido)-benzene or N,N',N''-tris(2-methylcyklohexyl)-1,2,3-propantricarboxamide belong to the youngest group of nucleating and clarifying agents. Some patents, such as WO 2004/072168 A2, EP 2 096 137 A1 describe also other substances belonging to this group. When comparing to the sorbitol based nucleating agents, these additives exhibit extremely high nucleating ability even at order-of-magnitude lower concentrations (typically $10^{-2}$% w/w).

All the above mentioned nucleating agents assist the crystallization of polypropylene only into its basic α-form. The substances, which enable the crystallization of polypropylene in its β-crystalline form, represent a separate group among the highly efficient non sorbitol-like nucleating agents. So, N,N'-dicyclohexylnaphtalene-2,6-dicarboxamide is a typical commercial representative of β-nucleating agent. There are other compounds enabling β-nucleation of polypropylene. These are listed in patents EP 0 962 489 B1, EP 0 557 721 A2 and WO 03/102069 A1, resp.

The nucleating propensity of an agent is determined by several factors, the specific size and shape of the primary particles of nucleant being the most important one. So, the elimination of secondary agglomerates of the nucleant primary particles is imperative for the successful nucleation process. At the same time, it is necessary to prevent the formation of nucleating agent agglomerates in the course of its dispersion in polymer matrix.

Good additive dispersion in the polymer matrix is necessary for achieving the desired improvement of material properties. In the case of nucleating agents which are dosed at very low levels (typically within 0.01-1.00% w/w) a good dispersion is of particular importance.

The melt mixing in an extruder is a well known and widely used method of introducing the additives into the polymer. It is, however, demanding both from technical and energy consumption view. To assure homogeneity, intensive mixing in a powerful twin-screw extruder is frequently required. It is often necessary to dose the nucleating agent in the concentrate form which is subsequently diluted with parent polymer to reach the desired concentration level.

OBJECT OF THE INVENTION

It is an object of the invention to eliminate as much as possible the disadvantages of the current approach used for the preparation of nucleated semi-crystalline polyolefins via melt mixing in an extruder. The object of the invention has been achieved by adding the nucleating agent in form of a suspension or solution in a non-polar solvent or in the concentrated organo-aluminum compound as a component of the catalyst system used for α-olefin polymerization.

From the availability viewpoint, it is advantageous to use a nucleant from the group of inorganic compounds such as talc, CaO, MgO, $TiO_2$, silica ($SiO_2$), alumina ($Al_2O_3$), clay, graphite and carbon nanotubes.

Out of organic compounds, the suitable structures are selected from the non-sorbitol group of nucleating agents of general formulae (I.a-d):

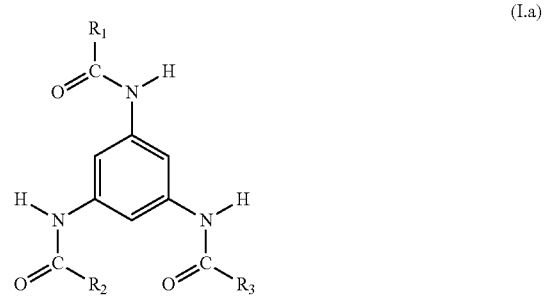

(I.a)

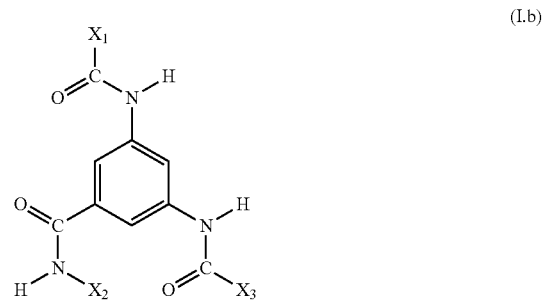

(I.b)

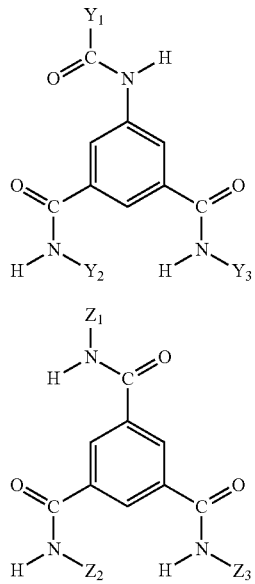

wherein $R_1$, $R_2$ and $R_3$, or $X_1$, $X_2$ and $X_3$, or $Y_1$, $Y_2$ and $Y_3$, or $Z_1$, $Z_2$ a $Z_3$ independently represent:

$C_1$-$C_{20}$ alkyl unsubstituted or substituted by one or more hydroxy;

$C_2$-$C_{20}$ alkenyl unsubstituted or substituted by one or more hydroxy;

$C_2$-$C_{20}$ alkyl interrupted by oxygen or sulphur;

$C_3$-$C_{12}$ cycloalkyl unsubstituted or substituted by one or more $C_1$-$C_{20}$ alkyl;

($C_3$-$C_{12}$ cycloalkyl)-$C_1$-$C_{10}$ alkyl unsubstituted or substituted by one or more $C_1$-$C_{20}$ alkyl;

branched $C_3$-$C_{20}$ alkyl unsubstituted or substituted by one or more hydroxy;

phenyl unsubstituted or substituted by one or more radicals selected from $C_1$-$C_{20}$ alkyl, $C_1$-$C_{20}$ alkoxy, $C_1$-$C_{20}$ alkylamino, di($C_1$-$C_{20}$ alkyl) amino, hydroxy and nitro;

phenyl-$C_1$-$C_{20}$ alkyl unsubstituted or substituted by one or more radicals selected from $C_1$-$C_{20}$ alkyl, $C_3$-$C_{12}$ cycloalkyl, phenyl, $C_1$-$C_{20}$ alkoxy and hydroxy;

biphenyl-($C_1$-$C_{10}$ alkyl) unsubstituted or substituted by one or more $C_1$-$C_{20}$ alkyl;

naphthyl unsubstituted or substituted by one or more $C_1$-$C_{20}$ alkyl;

naphthyl-$C_1$-$C_{20}$ alkyl unsubstituted or substituted by one or more $C_1$-$C_{20}$ alkyl;

or according to the general formula (II.):

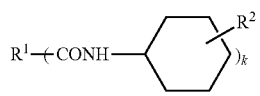

wherein k is an integer of 3 or 4;

$R^1$ is a residue obtained by removing all of the carboxyl groups from 1,2,3-propanetricarboxylic acid, 1,2,3,4-butanetetracarboxylic acid or 1,3,5-benzenetricarboxylic acid;

and the three or four $R^2$s are the same or different, and each independently represents a hydrogen atom or a $C_1$-$C_{10}$, linear or branched alkyl group, or compounds of general formulae (III.a-c):

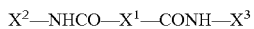 (III.a)

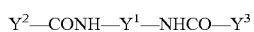 (III.b)

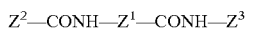 (III.c)

wherein $X^1$ or $Y^1$ or $Z^1$ independently represent:
unsubstituted linear $C_2$-$C_{20}$ alkyl;
unsubstituted linear $C_2$-$C_{20}$ alkenyl;
$C_3$-$C_{12}$ cycloalkyl;
phenyl;
biphenyl;
naphthyl
and $X^2$, $X^3$ or $Y^2$, $Y^3$ or $Z^2$, $Z^3$ independently represent:
$C_3$-$C_{12}$ cykloalkyl unsubstituted or substituted by one or more radicals selected from $C_1$-$C_{20}$ aliphatic alkyl, $C_3$-$C_{20}$ branched alkyl, $C_2$-$C_{20}$ aliphatic alkenyl, $C_3$-$C_{20}$ branched alkenyl, $C_3$-$C_{12}$ cycloalkyl and phenyl;
phenyl unsubstituted or substituted by one or more radicals selected from $C_1$-$C_{20}$ aliphatic alkyl, $C_3$-$C_{20}$ branched alkyl, $C_2$-$C_{20}$ aliphatic alkenyl, $C_3$-$C_{20}$ branched alkenyl, $C_3$-$C_{12}$ cycloalkyl and phenyl;

A non polar hydrocarbon solvent selected from the group involving liquefied propane, propene, butane, isomers of pentane, hexane, octane, nonane, decane, cyclopentane, cyclohexane, benzene, toluene, xylene and mineral oils is suitable for the procedure described by this invention.

In order to eliminate negative effects of organic nucleating agents on the polymerization process, it is advisable to select the organo aluminum component from the group involving trimethylaluminum, triethylaluminum, tributylaluminum, triisobutylaluminum, trihexylaluminum, trioctylaluminum, diethylaluminum chloride, ethylaluminum dichloride, di-isobutylaluminum chloride, isobutylaluminum dichloride, diethylaluminum iodide, and methylaluminoxane.

From the industrial viewpoint, it is advisable to use solutions of concentrated organoaluminum compounds instead of hydrocarbon solvent for when preparing suspensions and solutions of nucleating agents to be dosed as a part of the catalyst system into the polymerization reactor.

To assure good dispersion of inorganic nucleating agents and to eliminate the formation of secondary agglomerates, it is suitable to add surface active agents based on tertiary aliphatic amines of general formula:

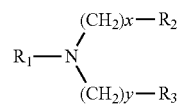

where $R_1$ represents $C_{12}$-$C_{22}$ alkyl attached directly to nitrogen —$(CH_2)_{11-21}$—$CH_3$ or through the carbonyl group —CO—$(CH_2)_{11-21}$—$CH_3$, $R_2$ and $R_3$ represent —OH, —COOH, —CO-alkyl while x and y are integers of 2 to 5 independent on each other.

The concentration of inorganic nucleating agent suspension in non-polar hydrocarbon solvent is typically within 0.01-0.50 g/mL.

The recommended concentration of surface active substance used for the dispersion of inorganic nucleants is within 0.5-6.0 mg/mL.

It is advisable to use an ultrasonic bath for 10-240 minutes when making the suspension of nucleating agent.

The suitable concentration range of organic nucleating agents in non polar hydrocarbon solvent or in the solution of concentrated organoaluminum compounds lies within 0.001-0.500 g/mL.

In the case of α-olefin polymerization in the presence of organic nucleating agents the suitable mass ratio of organic nucleating agent to organoaluminum compound is 0.1-3.0 g/g.

BRIEF DESCRIPTION OF THE DRAWINGS

FIG. 1: DSC profile of $2^{nd}$ melting of sample 5-Polypropylene "in situ" nucleated by component 1D (β-nucleating agent based on N,N'-dicyclohexyl naphthalene-2,6-dicarboxamide, nucleating agent concentration level 0.03 wt. %) compared with non-nucleating reference material.

FIG. 2: DSC profile of $2^{nd}$ melting of sample 6-propylene/ethylene statistical copolymer nucleated "in situ" by 1D component (β-nucleating agent based on N,N'-dicyclohexyl naphthalene-2,6-dicarboxamide, nucleating agent concentration level 0.03 wt. %) compared with non-nucleating reference material.

EXAMPLES

According to the invention, the process of making "in situ" nucleated polyolefin is based on the introduction of inorganic or organic nucleating agent directly into the polymerization reactor in which the polymer synthesis is subsequently carried out. The nucleating agent, organic or inorganic, is applied in form of a suspension or solution made prior to polymerization. In this way a good dispersion of nucleant primary particles is assured without forming secondary agglomerates. At the same time, any potentially negative effect of nucleant upon the polymerization catalyst performance is eliminated. The polymer synthesis may proceed both in hydrocarbon solvent suspension and in the liquid monomer or in the gas phase, the latter being preferred. The polymerization temperature and pressure are selected depending on the process and catalyst type, the temperature range being usually within 40-100° C. and pressure range within 1.0-4.0 MPa.

All the semi crystalline polyolefins that may be synthesized by using Ziegler-Natta catalysts based on milled or precipitated $TiCl_3$, supported phtalate, salicylate or diether $TiCl_4/MgCl_2$ catalysts, supported $TiCl_4/SiO_2$, $TiCl_4/Mg(OR)_2/SiO_2$ (R=alkyl) or $TiCl_4/MgCl_2/SiO_2$ catalysts, Philips catalysts, metallocene and "single-site" catalysts may be nucleated by applying the "in situ" process. The supported phthalate, salicylate or diether $TiCl_4/MgCl_2$ Ziegler-Natta catalysts are, however, preferred.

As to the co-catalyst, organoaluminum compounds can be used, such as trimethylaluminum, triethylaluminum, tributylaluminum, tri-isobutylaluminum, trihexylaluminum, trioctylaluminum, diethylaluminum chloride and methylaluminoxane; triethylaluminum (TEA) is, however, preferred. The molar ratio of organoaluminum co-catalyst to catalyst transition metal content will depend on process type and catalyst system. Its value for the Ziegler-Natta catalysts is within 20-800 mol/mol while for metallocenes and "single site" catalysts it varies from 100-50,000 depending on the co-catalyst type.

In the case of propylene homopolymerization or copolymerization of propylene with a co-monomer using the Ziegler-Natta catalysts, it is advisable to use also an alkoxysilane component in order to increase the stereoregularity. Out of compounds used for this purpose, di-isopropyl-di-methoxy silane (DIPDMS), di-isobutyl-di-methoxy silane (DIB-DMS), cyclohexylmethyl-di-methoxy silane (CHMDMS) and di-cyclopentyl-di-methoxy silane (DCPDMS) are the most frequently used. The molar ratio of alkoxy silane compound to catalyst transition metal content will depend on the process type and Ziegler-Natta catalyst. Its value is within 0-40 mol/mol.

The rank of polymers suitable for "in situ" nucleation involves ethylene and propylene homopolymers as well as their mutual copolymers, their copolymers and terpolymers with higher α-olefins, such as 1-butene, 1-pentene, 1-hexene, 1-octene, 4-methyl-1-pentene, butadiene and isoprene. The minimum crystalline phase content (in terms of cool xylene insolubles) should, however, be at least 70% w/w, optimally 90% w/w and more. The co-monomer content in these "in situ" nucleated statistical copolymers or terpolymeres should be within 0.1-15.0% w/w, the optimum range being 0.2-6.0% w/w. In the case of sequential "in situ" copolymers or terpolymers, the copolymer (rubber phase) content in the homopolymer matrix can vary from 5-40% w/w, the optimum range being 10-25% w/w. The copolymer rubber phase should contain 30-70% w/w of built-in comonomer, optimally 40-60% w/w.

The "in-situ" nucleation process has been tested in discontinuous laboratory reactors. Nevertheless, the technique of introducing the nucleating agent suspension or solution into the reactor as one of the catalyst components is easily applicable to the continuous processes and industrial reactors, such as HSBR (Horizontal Stirred Bed Reactor) or CSTR (Continuous Stirred Tank Reactor).

The way of dosing nucleation agent suspension or solution as one of the polymerization components into the reactor is easily applicable to continuous industrial reactors in which the liquid phase polymerization is subsequently combined with gas phase polymerization.

In order to assure good dispersion and reproducible dosing of nucleating agent into the reactor, the suspension of nucleating agents in a non-polar hydrocarbon solvent was prepared. The following solvents may serve the examples: isomers of pentane, hexane, heptane, octane, nonane and decane; cyclopentane, cyclohexane, benzene, toluene and xylene and its isomers. Moreover, liquefied gases, such as propane, propylene, butane and also mineral oils can be used for this purpose. Hexane, heptane and mineral oils are the preferred solvents.

Further improvement of nucleating agent dispersion and elimination of secondary agglomerates formation is achieved by the addition of surface active agent on the basis tertiary aliphatic amines of the general formula:

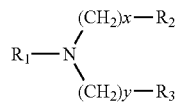

Where $R_1$ represents $C_{12}$-$C_{22}$ alkyl attached directly to nitrogen —$(CH_2)_{11-21}$—$CH_3$ or through the carbonyl group CO—$(CH_2)_{11-21}$—$CH_3$, $R_2$ and $R_3$ represent —OH, —COOH, —CO-alkyl while x and y are integers of 2 to 5 independent on each other. N,N-bis(2 hydroxyethyl)-$_{14-16}$ alkyl amine or N,N-bis(2-hydroxyethyl)-tallow amine may serve typical examples.

The application of an ultrasonic bath (stainless steel vessel furnished with ultrasound source and filled with water) is another important step the nucleant dispersion.

In order to eliminate negative influence of organic nucleation agents upon the polymerization process it is advised to add an organoaluminum catalyst modifier, such as trimethylaluminum, triethylaluminum, tributylaluminum, tri-isobutylaluminum, trihexylaluminum, trioctylaluminum, diethylaluminum chloride, ethylaluminum dichloride, di-isobutylaluminum chloride, isobutylaluminum dichloride, diethylaluminum iodide and methylaluminoxane. Triethylaluminum is, however, preferred as the organoaluminum component.

The diluted organoaluminum concentrates can be used instead of a non-polar hydrocarbon solvent for making suspensions and solutions of nucleating agents suitable for dosing into the polymerization reactor as a part of catalyst system.

The concentration of inorganic nucleating agent suspension in hydrocarbon solvent within 0.01-0.50 g/mL is considered to be suitable for the "in-situ" nucleation. The range from 0.15 to 0.35 g/mL is, however, optimal. If the surfactant is necessary to be added then its concentration in the suspension should be in the range of 0.5-6.0 mg/mL, preferably within 2.0-4.0 mg/mL. The suspension should be exposed to the ultra sound treatment for 10-240 minutes, the exposure within 20-60 minutes being preferred.

The concentration of organic nucleating agent suspension in hydrocarbon solvent within 0.001-0.500 g/mL is considered to be suitable for the "in-situ" nucleation of semi crystalline polyolefin, preferably within 0.05-0.15 g/mL.

In order to reduce the risk due to the negative influence of organic nucleating agents upon the polymerization catalyst it is advised to mix the nucleant with the organoaluminum component at the ratio nucleant/organoaluminum=0.1-3.0, preferably at 0.3-1.5.

All kinds of inorganic nucleating agents are suitable for making "in situ" nucleated semi crystalline polymer, such as CaO, MgO, $TiO_2$, silica ($SiO_2$), alumina ($Al_2O_3$), clays, graphite and carbon nanotubes.

As to the organic nucleating agents, the compounds out of the group of non-sorbitol type nucleants are suitable (see formulae I. a-d):

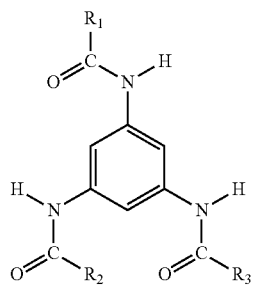
(I.a)

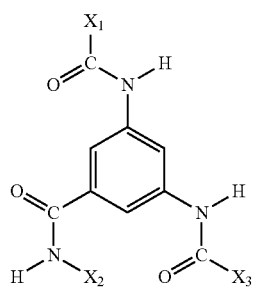
(I.b)

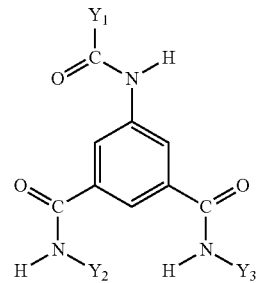
(I.c)

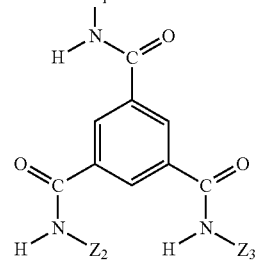
(I.d)

wherein $R_1$, $R_2$ and $R_3$, or $X_1$, $X_2$ and $X_3$, or $Y_1$, $Y_2$ and $Y_3$, or $Z_1$, $Z_2$ a $Z_3$ independently represent:

$C_1$-$C_{20}$ alkyl unsubstituted or substituted by one or more hydroxy;

$C_2$-$C_{20}$ alkenyl unsubstituted or substituted by one or more hydroxy;

$C_2$-$C_{20}$ alkyl interrupted by oxygen or sulphur;

$C_3$-$C_{12}$ cycloalkyl unsubstituted or substituted by one or more $C_1$-$C_{20}$ alkyl;

($C_3$-$C_{12}$ cycloalkyl)-$C_1$-$C_{10}$ alkyl unsubstituted or substituted by one or more $C_1$-$C_{20}$ alkyl;

branched $C_3$-$C_{20}$ alkyl unsubstituted or substituted by one or more hydroxy;

phenyl unsubstituted or substituted by one or more radicals selected from $C_1$-$C_{20}$ alkyl, $C_1$-$C_{20}$ alkoxy, $C_1$-$C_{20}$ alkylamino, di($C_1$-$C_{20}$ alkyl) amino, hydroxy and nitro;

phenyl-$C_1$-$C_{20}$ alkyl unsubstituted or substituted by one or more radicals selected from $C_1$-$C_{20}$ alkyl, $C_3$-$C_{12}$ cycloalkyl, phenyl, $C_1$-$C_{20}$ alkoxy and hydroxy;

biphenyl-($C_1$-$C_{10}$ alkyl) unsubstituted or substituted by one or more $C_1$-$C_{20}$ alkyl;

naphthyl unsubstituted or substituted by one or more $C_1$-$C_{20}$ alkyl;

naphthyl-$C_1$-$C_{20}$ alkyl unsubstituted or substituted by one or more $C_1$-$C_{20}$ alkyl;

or according to the general formula (II.):

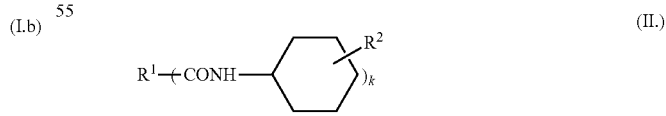
(II.)

Wherein k is an integer of 3 or 4;

$R^1$ is a residue obtained by removing all of the carboxyl groups from 1,2,3-propanetricarboxylic acid, 1,2,3,4-butanetetracarboxylic acid or 1,3,5-benzenetricarboxylic acid;

and the three or four $R^2$s are the same or different, and each independently represents a hydrogen atom or a $C_1$-$C_{10}$, linear or branched alkyl group;

or compounds of general formulae (III.a-c):

$$X^2\text{—NHCO—}X^1\text{—CONH—}X^3 \quad (\text{III.a})$$

$$Y^2\text{—CONH—}Z^1\text{—NHCO—}Y^3 \quad (\text{III.b})$$

$$Z^2\text{—CONH—}Z^1\text{—CONH—}Z^3 \quad (\text{III.c})$$

wherein $X^1$ or $Y^1$ or $Z^1$ independently represent:
unsubstituted linear $C_2$-$C_{20}$ alkyl;
unsubstituted linear $C_2$-$C_{20}$ alkenyl;
$C_3$-$C_{12}$ cycloalkyl;
phenyl;
biphenyl;
naphthyl and $X^2$, $X^3$ or $Y^2$, $Y^3$ or $Z^2$, $Z^3$ independently represent:

$C_3$-$C_{12}$ cykloalkyl unsubstituted or substituted by one or more radicals selected from $C_1$-$C_{20}$ aliphatic alkyl, $C_3$-$C_{20}$ branched alkyl, $C_2$-$C_{20}$ aliphatic alkenyl, $C_3$-$C_{20}$ branched alkenyl, $C_3$-$C_{12}$ cycloalkyl and phenyl;

phenyl unsubstituted or substituted by one or more radicals selected from $C_1$-$C_{20}$ aliphatic alkyl, $C_3$-$C_{20}$ branched alkyl, $C_2$-$C_{20}$ aliphatic alkenyl, $C_3$-$C_{20}$ branched alkenyl, $C_3$-$C_{12}$ cycloalkyl and phenyl.

The compounds selected from the group having structures (Ia), (II), and (IIIa) are preferred as nucleating agents for the "in situ" process for making nucleated semi-crystalline polymer. The following compounds can serve examples: 1,3,5-tris(2,2-dimethylpropaneamido)-benzene, N,N',N''-tris(methylcyclohexyl)-1,2,3-propane tricarboxamide and N,N'-dicyclohexylnaphtalene-2,6-dicarboxamide.

Both inorganic and organic nucleating agents can be used separately or mixed with one or more additional inorganic or organic nucleation agents.

In examples given below the ultra-fine talc with average particle size 5.0 μm (further denoted as the component 1A) was selected as a representative of inorganic nucleating agents.

Out of organic nucleants, the non-sorbitol type α-nucleating agents based on 1,3,5-tris(2,2-dimethylpropaneamido)-benzene (denoted as 1B) and N,N',N''-tris(2-methylcyclohexyl)-1,2,3-propanetricarboxamide (denoted as 1C), resp. were selected for examples presented below.

The β-nucleating agent for polypropylene used in examples was represented by N,N'-dicyclohexylnaphtalene-2,6-dicarboxamide (further denoted as 1 D).

Example of Suspension 1 Making Procedure:

In a covered glass vessel furnished with a teflon magnetic stirrer, 6 g of 1A component was mixed with 60 mL of n-heptane and 0.15 mL of surface active component (N,N-bis(2-hydroxyethyl)-$C_{14-16}$ alkyl amine or N,N-bis(2-hydroxyethyl)-tallow amine). The mixture was then subjected to ultrasound for 30 minutes. In the subsequent step a stream of pure nitrogen was bubbled through the solution at 80-90° C. until at least 20 mL or 20% n-heptane was distilled off. After cooling down the vessel was hermetically closed in order to prevent the suspension contamination with oxygen and water. In this way the homogeneous suspension of component 1A was obtained containing high portion of primary particles and a minimum of secondary agglomerates. The concentration of 1A in n-heptane was then 0.15 g/mL while that of surface active agent was 2.4 mg/mL.

Example of Suspension 2 Making Procedure:

In a covered glass vessel, 20 g of 1A component was mixed with 40 mL of nheptane, 0.20 mL of surface active component (N,N-bis(2-hydroxyethyl)-$C_{14-16}$ alkyl amine or N,N-bis(2-hydroxyethyl)-tallow amine) and 60 mL of mineral oil. The mixture was then subjected to ultrasound for 60 minutes. In the subsequent step a stream of pure nitrogen was bubbled through the mixture at 80-90° C. until constant weight was reached, i.e. until all volatiles, namely n-heptane, were evaporated. In this way the homogeneous suspension of component 1A in mineral oil was obtained containing high portion of primary particles and a minimum of secondary agglomerates. The concentration of 1A in mineral oil was then 0.33 g/mL while that of surface active agent was 3.1 mg/mL.

Example of Suspension 3 Making Procedure:

In a covered glass vessel, 3 g of 1B component was mixed with 50 mL of n-heptane. In the subsequent step a stream of pure nitrogen was bubbled through the mixture at 80-90° C. until 20 mL or at least 20% of n-heptane was distilled off. After cooling down, 35 mL of triethylaluminum (TEA) solution in heptane (200 mg/mL) was added stepwise under a nitrogen protection atmosphere and constant stirring. Thus the final 1B/TEA ratio=0.43 g/g was achieved. The reaction of TEA with 1B is accompanied by gas and heat evolution. After reaching certain temperature a complete dissolution of 1A is observed and a clear and colorless solution is obtained. During cooling down the solution opacity is gradually increasing due to the re-precipitation of modified 1B component. Thus the suspension of recrystallized, TEA modified 1B component in heptane is obtained. The suspension is then concentrated by distilling off a part of n-heptane by means of pure nitrogen bubbling through at 80-90° C. to reach the desired concentration 0.10 mg/mL.

Example of Suspension 4 Making Procedure:

In a covered glass vessel furnished with a teflon stirrer, 3 g of 1C component was mixed with 20 mL of n-heptane. In the subsequent step a stream of pure nitrogen was bubbled through the system at 80-90° C. until at least 90% of n-heptane was removed. After cooling down, 35 mL of triethylaluminum (TEA) solution in heptane (200 mg/mL) was added stepwise under a nitrogen protection atmosphere and constant stirring. Thus the final 1C/TEA ratio=0.43 g/g was achieved. In this case the reaction with TEA leads to a complete dissolution of 1C and the solution remains clear even after cooling down. It is therefore not necessary to concentrate the solution by distilling off the n-heptane. The final concentration of 1C is then 0.09 mg/mL. The homogeneous solution thus obtained enables a precise dosing of 1C into the polymerization reactor. The re-precipitation of 1C occurs when the solution gets in contact with air or some polar compound.

Example of Suspension 5 Making Procedure:

The procedure is identical with that described for Suspension 3 with the provision that instead of 3 g of 1B component the same amount of 1D component is used.

In Order to Compare Mechanical Properties the Following Reference Samples were Prepared:

1. Example of Propylene Homopolymer Synthesis.

The polypropylene synthesis was carried out in a 50 L batch stainless steel reactor fitted with an electromotor driven spiral stirrer and magnetic clutch. Maximum operating pressure was 2.5 MPa, temperature up to 100° C. The reference polymerization was carried out at 2.2 MPa and 75° C. The polymerizations were carried out in the gas phase.

Before each polymerization the reactor was evacuated at 85° C. for 30 minutes and subsequently seven times pressurized with nitrogen to 0.8-1.0 MPa. After this cleaning procedure, the vessel was cooled down to the temperature of catalyst sampling which was selected to be 35° C. During this period the reactor was additionally flushed three times with nitrogen.

After reaching the sampling temperature, the stirring was switched off and the triethylaluminum (TEA) solution and di-isobutyl-di-methoxy silane external donor solution in n-heptane were added. During the sampling operation the internal reactor space was protected from air contamination by a stream of nitrogen.

After closing, 300 mmol of hydrogen and 2500 g of propylene was admitted to the reactor in such a way that first 2000 g of propylene were added immediately while the remaining 500 g were used for flushing the catalyst into the reactor.

When all the components were dosed and the temperature kept constant at 35° C., the suspension of diether $TiCl_4/MgCl_2$ catalyst in mineral oil was introduced. The catalyst amount used for the polymerization was 0.08 mmol-Ti, the molar ratio of external donor DIBDMS/Ti=1 and molar ratio TEA/Ti=60.

After all the catalyst was introduced, the reactor was heated up to reach the polymerization temperature and pressure. When 95% of polymerization pressure was achieved, the measurement of polymerization time was started. The process was proceeding in the gas phase and mechanically stirred bed.

All operations, start up and the polymerization itself were computer controlled and monitored. After reaching the required polymerization temperature and pressure, these conditions were kept constant for the whole duration of the experiment. The constant pressure was maintained by continuous dosage of the propylene monomer. Constant concentration of hydrogen in the vapor phase was maintained by its continuous dosing simultaneously with the monomer stream. After consuming the defined propylene quantity (3 kg), the monomer stream was stopped and the polymerization process was killed by admitting 100 mmol oxygen into the reactor. Subsequently, the reactor was de-gassed and pressurized three times to 0.8-1.0 MPa with nitrogen.

After opening the reactor, the polymer fluff was weighed and dried at 70° C. for two hours. The reference propylene homopolymer thus obtained exhibited melt flow rate 6.0-8.0 g/10 min. The value of xylene solubles was found to be less than 3.0% w/w.

2. Example of Propylene-Ethylene Statistical Copolymer Synthesis.

The basic procedure and polymerization conditions were identical with those described for PP homopolymer. In this case, however, the ethylene comonomer was dosed continuously together with the hydrogen stream. Similarly as in the hydrogen case, the amount of dosed ethylene is controlled by the propylene consumption rate to maintain both ethylene and hydrogen concentration constant during the whole polymerization process.

Initial amounts of hydrogen and ethylene were selected in the way which enabled the synthesis of statistical copolymer with melt flow rate within 0.15-0.25 g/10 min and ethylene content 3.0-4.0% w/w. These parameters correspond to the material suitable for the pressure pipe manufacture.

3. Example of Propylene-Ethylene Sequential Copolymer Synthesis.

The synthesis of sequential copolymer proceeded in two steps. In the first step, the homopolymerization of propylene took place under the same conditions as those applied during the reference homopolymer PP sample preparation. The TEA/DIBDMS/Ti molar ratio was 50/5/1. The hydrogen concentration was set to achieve the homopolymer matrix melt flow rate equal to 9-11 g/10 min.

After obtaining 2.6 kg of PP homopolymer the reactor was de-pressurised to the pressure close to the atmospheric. When the temperature dropped down to 66° C. a defined quantity of propylene, ethylene and hydrogen was introduced at pressure 2.2 MPa into the reactor at the ratio necessary for the synthesis of statistical copolymer with ca 50% ethylene. The copolymerization proceeded until the ethylene consumption corresponded to 10-12% w/w of overall ethylene built in the sequential copolymer, i.e. to 20-24% w/w ethylene content in the statistical copolymer present in the resulting polymer. The hydrogen concentration was selected in the way which enabled to receive the melt flow rate of the resulting sequential copolymer to be within 3.0-4.0 g/10 min. The polymerization yield was 3.6 kg. These materials are particularly suitable for automotive applications.

Samples of Polyolefins Nucleated "In Situ" Using Different Nucleants were Obtained in the Following Way:

"In Situ" Synthesis Example 1:

The basic procedure and polymerization conditions were identical with those applied to reference polymer synthesis. The external donor (DIBDMS) and TEA were sampled into the reactor at 35° C. Finally, the component 1A in form of Suspension 1 was introduced. The amount of Suspension 1 corresponded to that necessary to obtain 3 kg of PP fluff nucleated with 1A at level 0.4% w/w. The molar TEA/DIBDMS/Ti ratio was equal to 60/1/1. The polymerization was terminated after reaching the predefined propylene consumption.

"In Situ" Synthesis Example 2:

The basic procedure and polymerization conditions were identical with those applied to reference polymer synthesis. The external donor (DIBDMS) and TEA were sampled into the reactor at 35° C. Finally, the component 1A in form of Suspension 2 was introduced. The amount of Suspension 2 corresponded to that necessary to obtain 3 kg of PP fluff nucleated with 1A at level 0.4% w/w. The molar TEA/DIBDMS/Ti ratio was equal to 60/1/1. The polymerization was terminated after reaching the predefined propylene consumption.

"In Situ" Synthesis Example 3:

The basic procedure and polymerization conditions were identical with those applied to reference polymer synthesis. The external donor (DIBDMS) and TEA were sampled into the reactor at 35° C. Finally, the component 1B in form of Suspension 3 was introduced. The amount of Suspension 3 corresponded to that necessary to obtain 3 kg of PP fluff nucleated with 1B at level 0.03% w/w. The molar TEA/DIBDMS/Ti ratio was equal to 60/1/1. The polymerization was terminated after reaching the predefined propylene consumption.

"In Situ" Synthesis Example 4:

The basic procedure and polymerization conditions were identical with those applied to reference polymer synthesis. The external donor (DIBDMS) and 1C in form of Suspension 4 were sampled into the reactor at 35° C. The amount of Suspension 4 corresponded to that necessary to obtain 3 kg PP fluff nucleated with 1C at level 0.1% w/w. In this case, it was not necessary to add the triethylaluminum cocatalyst (TEA) since the catalyst activation was effected by the presence of Suspension 4 alone which already contained the TEA. The DIBDMS/Ti ratio was equal to 1. The polymerization was terminated after reaching the predefined propylene consumption.

"In Situ" Synthesis Example 5:

The basic procedure and polymerization conditions were identical with those applied to reference polymer synthesis. The external donor (DIBDMS) and TEA were sampled into the reactor at 35° C. Finally, the component 1D in form of Suspension 5 was introduced. The amount of Suspension 5 corresponded to that necessary to obtain 3 kg of PP fluff nucleated with 1D at level 0.03% w/w. It was possible to decrease the TEA/DIBDMS/Ti ratio to 20/1/1 since the Suspension 5 contained additional TEA. The polymerization was terminated after reaching the predefined propylene consumption.

"In Situ" Synthesis Example 6:

The basic procedure and polymerization conditions were identical with those applied to the reference statistical polymer synthesis. The external donor (DIBDMS) and TEA were sampled into the reactor at 35° C. Finally, the component 1D in form of Suspension 5 was introduced. The amount of Suspension 5 corresponded to that necessary to obtain 3 kg of PP fluff nucleated with 1D at level 0.03% w/w. It was possible to decrease the TEA/DIBDMS/Ti ratio to 20/1/1 since the Suspension 5 contained additional TEA. The DIBDMS/Ti ratio was equal to 5/1.

"In Situ" Synthesis Example 7:

The basic procedure and polymerization conditions were identical with those applied to the reference sequential polymer synthesis. The external donor (DIBDMS) and component 1C in form of Suspension 4 were sampled into the reactor at 35° C. The amount of Suspension 4 corresponded to that necessary to obtain 3.6 kg of sequential copolymer nucleated with 1C at level 0.1% w/w. It was possible to decrease the TEA/DIBDMS/Ti ratio to 20/1/1 since the Suspension 4 contained additional TEA. In this case, it was not necessary to add the triethylaluminum cocatalyst (TEA) since the catalyst activation was effected by the presence of Suspension 4 alone which already contained the TEA. The DIBDMS/Ti ratio was equal to 5/1.

The Following Analytical Methods were Used to Examine the Influence of "In Situ" Nucleation Upon Material Properties:

Basic structural properties were determined both for the reference sample and "in situ" nucleated polymer fluffs. Melt mass flow rate (MFR) of polymer was determined according to ISO 1133:1991 at 230° C. and 21.16 N load. Bulk density (BD) of polymer fluff was determined according to ISO 60:1977. The portion of polymer soluble in cool xylene (XS) was determined according to ISO 6427:1992 (Annex B).

The fluff samples were pelletized on a single-screw PLE 651 Brabender extruder (D=19 mm, L/D=30) at 220° C. and 70 rev/min. Prior to pelletization, the fluff was stabilized by 0.2% w/w Irganox B225. The test specimens were prepared from the granules using a 320C Arburg Allrounder injection molding machine. The injection molding conditions were set according to ISO 1873-2:1997. The test specimens were conditioned at 23° C. for 7 days.

The crystallization time peak was determined by applying the isothermal crystallization method on a DSC 7 Perkin-Elmer instrument. A 5-10 mg sample (pellet) was placed into an aluminum pan and heated from 50° C. up to 210° C. The sample was maintained at this temperature for 8 minutes. The molten material was then cooled down to crystallization temperature (129° C.) at a rate 80° C./min. When the crystallization temperature was reached, the measurement of the time necessary to reach the maximum of crystallization peak started.

The DSC measurement of $1^{st}$ melting, crystallization and $2^{nd}$ melting was done on a DSC Q 100 TA Instruments calorimeter. A 5-10 mg sample was heated within temperature range 50-200° C. After reaching 200° C., the sample was maintained at this temperature for 8 minutes and then cooled down to 50° C. at the same rate. Immediately after this, the second melting cycle in the same temperature interval was carried out.

The portion of polypropylene β-crystalline form was determined on the basis of measurements of the $2^{nd}$ melting. The fraction of β-crystalline form in sample was then calculated from enthalpies of melting of α- and β-phase according to formula (1):

$$\beta(\%) = \frac{dH_m(\beta)}{dH_m(\alpha) + dH_m(\beta)} \cdot 100 \tag{1}$$

Opacity of the polymer materials was determined according to ASTM D 1003-00 standard using injection molded 100×100×1 mm plates.

Notched and Charpy impact strength was measured at 23° C. according to ISO 179 on a 5102 Zwick instrument. The determination of tensile properties and elasticity modulus in tension was carried out according to ISO 178. The yield strength and elongation at yield were measured on a 4466 Instron instrument while elasticity moduli in tension and in flexure were obtained on a 4302 Instron.

Discussion of Results:

It follows that the application of nucleating agents (1A-1D) in form of a hydrocarbon solvent suspension (Suspension 1-5) modified by the addition of an antistatic or organometallic compound has no significant effect upon the resulting structural and morphological parameters, such as MFR, BD and XS, of thus prepared polymer. The determination of crystallization time peak maximum shows that the modification of nucleating agents and their application in polymerization had no effect on their polypropylene nucleating ability. Moreover, it shows that this procedure enables to carry out the nucleation directly in the reactor thus obtaining polypropylene with considerably higher modulus of elasticity in tension and flexure than that of the reference, i.e. non-nucleated, material. Logically, the toughness of this material then decreases with the increasing strength. This follows from the results of Charpy impact strength measurements at 23° C. The values of yield strength and elongation at yield are in most cases comparable with the reference sample. The difference is seen only in Sample 5 where "in situ" nucleated polypropylene was nucleated by the 1D component (β-nucleating agent based on N,N'-dicyclohexylnaphtalene-2,6-dicarboxamide). The DSC measurement of second melting showed that Sample 5 contained approximately 83% of the β-phase (see FIG. 1). This clearly shows that the application of modified nucleating agent in the polymerization had no negative influence upon its β-nucleation ability.

TABLE 1

Properties "in situ" nucleated polypropylene samples in comparison with reference material prepared without nucleating agent (NA) in the reactor.

| | | Polymer properties | | | Nucleation ability | | Mechanical properties | | | | |
|---|---|---|---|---|---|---|---|---|---|---|---|
| | | | | | Crystal. | | Impact | | Elongation | Elast. | Elast. |
| Sample | NA/PP wt % | MFR 21N g/10 min | Bulk density g/L | Xylene solubles wt % | peak 129° C. min | Opacity % | strength 23° C. kJ/m2 | Yield strength MPa | at yield % | modulus in tension MPa | modulus in flexion MPa |
| Reference polymer without nucleation agent | | | | | | | | | | | |
| Ref. 1 | 0.00 | 7.3 | 398 | 2.5 | 6.1 | 38.1 ± 1.1 | 209 ± 56 | 34.6 ± 0.2 | 7.9 ± 0.2 | 1560 ± 40 | 1610 ± 20 |
| Synthesis 1 | | | | | | | | | | | |
| Sample 1 | 0.42 | 8.3 | 414 | 2.7 | 2.0 | not measured | 115 ± 12 | 36.5 ± 0.4 | 7.3 ± 0.1 | 1730 ± 60 | 1800 ± 10 |
| Synthesis 2 | | | | | | | | | | | |
| Sample 2 | 0.45 | 5.9 | 391 | 3.2 | 2.0 | not measured | 165 ± 10 | 35.6 ± 0.2 | 8.0 ± 0.1 | 1660 ± 60 | 1700 ± 10 |
| Synthesis 3 - pellets | | | | | | | | | | | |
| Sample 3-G | 0.03 | 7.4 | 423 | 2.6 | 0.8 | 11.7 ± 0.8 | 153 ± 18 | 37.0 ± 0.2 | 7.0 ± 0.1 | 1930 ± 30 | 1740 ± 20 |
| Synthesis 3 - fluff | | | | | | | | | | | |
| Sample 3-P | 0.03 | 7.4 | 423 | 2.6 | 0.7 | 11.0 ± 0.5 | 141 ± 19 | 37.6 ± 0.1 | 6.3 ± 0.1 | 1970 ± 60 | 1990 ± 40 |
| Synthesis 4 | | | | | | | | | | | |
| Sample 4 | 0.09 | 12.2 | 429 | 3.0 | 0.6 | 21.7 ± 0.7 | 154 ± 34 | 37.2 ± 0.5 | 6.0 ± 0.2 | 1980 ± 30 | 1910 ± 80 |
| Synthesis 5 | | | | | | | | | | | |
| Sample 5 | 0.03 | 5.7 | 402 | 2.3 | 0.9 | not measured | 160 ± 43 | 33.0 ± 0.5 | 5.6 ± 0.2 | 1810 ± 50 | 1690 ± 30 |

TABLE 2

Properties "in situ" nucleated propylene ethylene statistical copolymer in comparison with reference material prepared without nucleating agent (NA) in the reactor.

| | Polymer properties | | | | | Mechanical properties | | | | |
|---|---|---|---|---|---|---|---|---|---|---|
| Sample | NA/PP wt % | MFR 21N g/10 min | Bulk density g/L | Xylene solubles wt % | Ethylene content wt % | Notched impact strength 23° C. kJ/m2 | Yield strength MPa | Elongation at yield % | Elast. modulus in tension MPa | Elast. modulus in flexion MPa |
| Reference polymer without nucleation agent | | | | | | | | | | |
| Ref. 2 | 0.00 | 0.17 | 334 | 8.2 | 3.7 | 29.8 ± 0.8 | 25.3 ± 0.5 | 12.2 ± 0.3 | 910 ± 20 | 950 ± 10 |
| Synthesis 6 | | | | | | | | | | |
| Sample 6 | 0.03 | 0.21 | 429 | 7.6 | 3.1 | 34.9 ± 0.3 | 24.4 ± 0.1 | 10.9 ± 0.2 | 890 ± 10 | 910 ± 30 |

TABLE 3

Properties "in situ" nucleated sequential propylene ethylene copolymer in comparison with reference material prepared without nucleating agent (NA) in the reactor.

| | Polymer properties | | | | | Mechanical properties | | | | |
|---|---|---|---|---|---|---|---|---|---|---|
| Sample | NA/PP wt % | MFR 21N g/10 min | Bulk density g/L | Xylene solubles wt % | Ethylene content wt % | Notched impact strength 23° C. kJ/m2 | Yield strength MPa | Elongation at yield % | Elast. modulus in tension MPa | Elast. modulus in flexion MPa |
| Reference polymer without nucleation agent | | | | | | | | | | |
| Ref. 3 | 0.00 | 3.5 | 405 | 18.3 | 11.4 | 54.0 ± 4.4 | 21.0 ± 0.1 | 6.6 ± 0.1 | 1000 ± 30 | 960 ± 50 |
| Synthesis 7 | | | | | | | | | | |
| Sample 7 | 0.10 | 3.8 | 420 | 17.5 | 10.8 | 57.7 ± 3.9 | 21.3 ± 0.2 | 5.3 ± 0.1 | 1170 ± 50 | 1200 ± 30 |

The same conclusions can be drawn in the case of the "in-situ" β-nucleated statistical ethylene-propylene copolymer (Sample 6 in Table 2). The DSC measurements of the second melting revealed that out of the overall number of polypropylene segments capable of crystallizing, 67% was present in the β-form (see FIG. 2).

In the case of Sample 3, one portion was pelletized by a standard procedure and subsequently used for making the injection molded specimens for mechanical properties measurements while the second portion was used for injection molding directly. The polymer fluff was stabilized by the addition of 0.2% w/w Irganox B 225 prior to the injection molding. The subsequent mechanical properties measurement showed comparable values of both materials. This indicates that a good nucleant dispersion was achieved in the polymer fluff without involving the pelletization step. The results of opacity measurements show that the use of modified components 1B and 1C in the polymerization did not influence the ability of these nucleants to decrease the opacity thus increasing polypropylene clarity.

Results in Table 3 represent a comparison of the properties of "in-situ" nucleated sequential propylene-ethylene copolymer (TEA modified component 1 D) with the reference non-nucleated sample. The results indicate that also in this case the application of nucleating agent into the polymerization reactor as a catalyst system component enabled to obtain material exhibiting higher elasticity modulus in tension and flexure preserving material toughness comparable with that of the reference non nucleated sample.

INDUSTRIAL APPLICABILITY

This newly developed procedure can be used both in discontinuous and continuous production plants utilizing industrial HSBR (horizontal stirred bed reactors of Ineos company employing the Innovene® process) or CSTR (continuous stirred tank vertical reactors of Dow Chemical Company employing Unipol® process or Novolen® process utilized by Lummus Novolen Technology) equipment. It can also be employed in continuous industrial reactors combining liquid phase polymerization followed by the gas phase polymerization, such as Spheripol® process of Lyondell-Basell or Borstar® of Borealis.

The newly developed "in situ" nucleation method is particularly suitable for those industrial processes which do not involve the additivation and pelletization step at the polymer producer, such as Spherilene® of Lyondell-Basell where homogeneous nucleation agent dispersion in the resulting polymer fluff would be problematic.

The invention claimed is:
1. A method of preparation of nucleated semi-crystalline polyolefin during coordination α-olefin polymerization, wherein a nucleating agent is treated with a surface active substance modified by reaction with an organoaluminum and dosed into a polymerization reactor as a component of a catalyst system for α-olefin polymerization in the form of a suspension in a non-polar hydrocarbon solvent or in the form of a suspension or a solution in concentrated organoaluminum, wherein an inorganic or organic nucleating agent is directly introduced into a polymerization reactor in which a polymer synthesis is subsequently carried out, and wherein a nucleation agent is an inorganic substance selected from a group consisting of talc, CaO, MgO, $TiO_2$ silica ($SiO_2$), alumina ($Al_2O_3$), clay, graphite, carbon nanotubes, and combinations thereof, and wherein an organic nucleating agent is of a non-sorbitol type selected from a group of compounds of general formula (1.a-1.d):

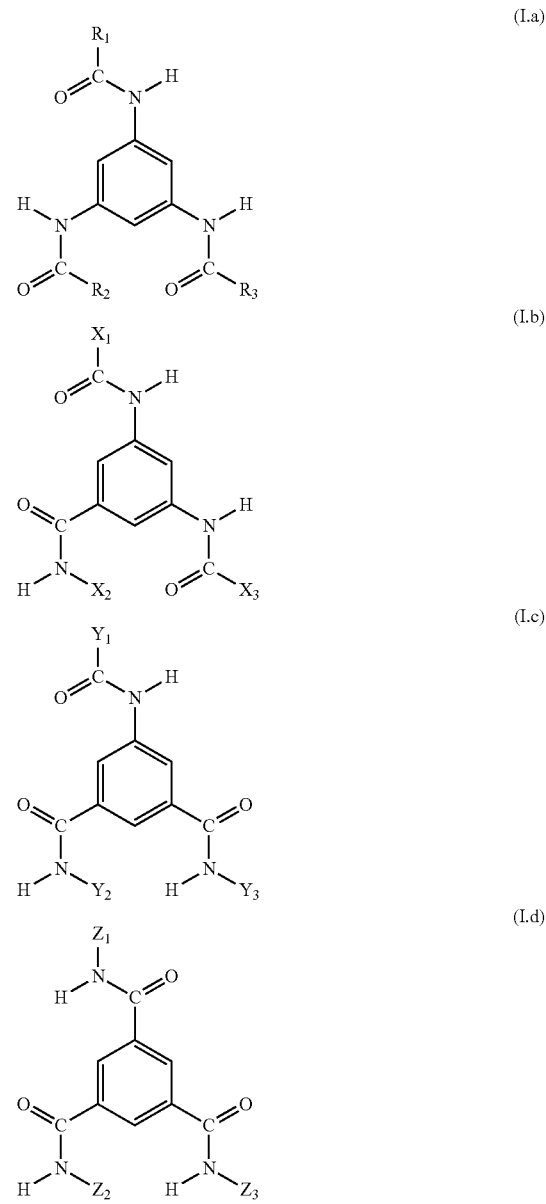

wherein:
$R_1$, $R_2$ and $R_3$, or $X_1$, $X_2$ and $X_3$, or $Y_1$, $Y_2$ and $Y_3$, or $Z_1$, $Z_2$ and $Z_3$ independently represent:
$C_1$-$C_{20}$ alkyl unsubstituted or substituted by one or more hydroxy;
$C_2$-$C_{20}$ alkenyl unsubstituted or substituted by one or more hydroxy;
$C_2$-$C_{20}$ alkyl interrupted by oxygen or sulphur;
$C_3$-$C_{12}$ cycloalkyl unsubstituted or substituted by one or more $C_1$-$C_{20}$ alkyl;
($C_3$-$C_{12}$ cycloalkyl)-C1-$C_1$0 alkyl unsubstituted or substituted by one or more $C_1$-$C_{20}$ alkyl;
branched $C_3$-$C_{20}$ alkyl unsubstituted or substituted by one or more hydroxy;
phenyl unsubstituted or substituted by one or more radicals selected from $C_1$-$C_{20}$ alkyl, $C_1$-$C_{20}$ alkoxy, $C_1$-$C_{20}$ alkylamino, di($C_1$-$C_{20}$ alkyl) amino, hydroxy and nitro;
phenyl-$C_1$-$C_{20}$ alkyl unsubstituted or substituted by one or more radicals selected from $C_1$-$C_{20}$ alkyl, $C_3$-$C_{12}$ cycloalkyl, phenyl, $C_1$-$C_{20}$ alkoxy and hydroxy;

biphenyl-($C_1$-$C_{10}$ alkyl) unsubstituted or substituted by one or more $C_1$-$C_{20}$ alkyl;

naphthyl unsubstituted or substituted by one or more $C_1$-$C_{20}$ alkyl;

naphthyl-$C_1$-$C_{20}$ alkyl unsubstituted or substituted by one or more $C_1$-$C_{20}$ alkyl;

or according to the general formula (II.):

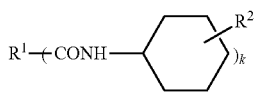

wherein:

k is an integer of 3 or 4;

$R^1$ is a residue obtained by removing all of the carboxyl groups from 1,2,3-propanetricarboxylic acid, 1,2,3,4-butanetetracarboxylic acid or 1,3,5-benzenetricarboxylic acid;

and the three or four $R^2$s are the same or different, and each independently represents a hydrogen atom or a $C_1$-$C_{10}$ linear or branched alkyl group;

or compounds of general formulae (III.a-III.c):

  (III.a)

  (III.b)

  (III.c)

wherein:

$X^1$ or $Y^1$ or $Z^1$ independently represent:
unsubstituted linear $C_2$-$C_{20}$ alkyl;
unsubstituted linear $C_2$-$C_{20}$ alkenyl;
$C_3$-$C_{12}$ cycloalkyl;
phenyl;
biphenyl;
naphthyl and $X^2$, $X^3$ or $Y^2$, $Y^3$ or $Z^2$, $Z^3$ independently represent at least one of:
$C_3$-$C_{12}$ cycloalkyl unsubstituted or substituted by one or more radicals selected from $C_1$-$C_{20}$ aliphatic alkyl, $C_3$-$C_{20}$ branched alkyl, $C_2$-$C_{20}$ aliphatic alkenyl, $C_3$-$C_{20}$ branched alkenyl, $C_3$-$C_{12}$ cycloalkyl and phenyl; and
phenyl unsubstituted or substituted by one or more radicals selected from $C_1$-$C_{20}$ aliphatic alkyl, $C_3$-$C_{20}$ branched alkyl, $C_2$-$C_{20}$ aliphatic alkenyl, $C_3$-$C_{20}$ branched alkenyl, and $C_3$-$C_{12}$ cycloalkyl and phenyl.

2. The method according to claim 1, wherein the nucleating agent is of an organic non-sorbitol type selected from the group consisting of 1,3,5-tris(2,2-dimethylpropanamido)benzene, N,N',N''-tris(2-methylcyclohexyl) 1,2,3-propanetricarboxamide, N,N'-dicyclohexylnaphthalene-2,6-dicarboxamide structure, and combinations thereof.

3. The method according to claim 1, wherein the non-polar hydrocarbon solvent for nucleation agent homogenization prior to dosing into the polymerization reactor is selected from the group consisting of liquefied propane, propene, butane, isomers of pentane, hexane, octane, nonane, decane, cyclopentane, cyclohexane, benzene, toluene, xylene, mineral oils, and combinations thereof.

4. The method according to claim 1, wherein the organic nucleating agent is, prior to its introduction into the polymerization reactor, modified by the addition of an organoaluminum compound selected from the group consisting of trimethylaluminum, triethylaluminum, tributylaluminum, tri-isobutylaluminum, trihexylaluminum, trioctylaluminum, diethylaluminum chloride, ethylaluminum dichloride, di-isobutylaluminum chloride, isobutylaluminum dichloride, diethylaluminum iodide, methylaluminoxane, and combinations thereof.

5. The method according to claim 1, wherein to the suspension of inorganic nucleating agent in the non-polar hydrocarbon a surface active agent is added, based on tertiary aliphatic amines of general formula:

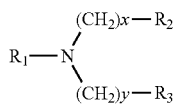

wherein $R_1$ represents $C_{12}$-$C_{22}$ alkyl attached directly to nitrogen —$(CH_2)_{11-21}$—$CH_3$ or through the carbonyl group —CO—$(CH_2)_{11-21}$—$CH_3$, $R_2$ and $R_3$ represent —OH, —COOH, —CO-alkyl while x and y are integers of 2 to 5 independent on each other.

6. The method according to claim 1, wherein the concentration of inorganic nucleating agent in the non-polar hydrocarbon prior to its introduction into the polymerization reactor is within the range of 0.01-0.50 g/mL.

7. The method according to claim 1, wherein the concentration of surface active agent used for dispersion of inorganic nucleating agents in the non-polar hydrocarbon prior to its introduction into the polymerization reactor is within the range 0.5-6.0 mg/mL.

8. The method according to claim 1, wherein the concentration of organic nucleating agents in the non-polar hydrocarbon solvent or in the concentrated organoaluminum prior to its introduction into the polymerization reactor is within the range 0.001-0.500 g/mL.

9. The method according to claim 1, wherein the mass ratio of organic nucleating agents to organoaluminum for the modification of the nucleating agent prior to introduction into the polymerization reactor is within a range of 0.1-3.0 g/g.

10. The method according to claim 1, wherein polymers subjected to nucleation involve ethylene and propylene homopolymers, their mutual statistical or sequential copolymers or copolymers and terpolymers with higher α-olefins selected from the group consisting of 1-butene, 1-pentene, 1-hexene, 1-octene, 4-methyl-1-pentene, butadiene and isoprene.

* * * * *

UNITED STATES PATENT AND TRADEMARK OFFICE
CERTIFICATE OF CORRECTION

PATENT NO. : 9,062,184 B2
APPLICATION NO. : 13/877417
DATED : June 23, 2015
INVENTOR(S) : Miroslav Skoumal et al.

It is certified that error appears in the above-identified patent and that said Letters Patent is hereby corrected as shown below:

In the claims

Claim 1, line 4 should read "…substance --or-- modified by reaction with an organoaluminum and…".

Signed and Sealed this
Twenty-second Day of December, 2015

Michelle K. Lee
*Director of the United States Patent and Trademark Office*